United States Patent
Gibas

[15] 3,643,525
[45] Feb. 22, 1972

[54] ADJUSTABLE CONTROL PEDALS FOR VEHICLES

[72] Inventor: Jack E. Gibas, Essexville, Mich.
[73] Assignee: General Motors Corporation, Detroit, Mich.
[22] Filed: May 26, 1970
[21] Appl. No.: 40,669

[52] U.S. Cl. ................................74/512, 74/513, 74/519, 74/560
[51] Int. Cl. .............................................................G05g 1/14
[58] Field of Search ........................74/512, 513, 519, 474.8

[56] References Cited

UNITED STATES PATENTS

| 3,151,499 | 10/1964 | Roe | 74/512 X |
|---|---|---|---|
| 3,563,111 | 2/1971 | Zeigler | 74/512 |

Primary Examiner—William F. O'Dea
Assistant Examiner—F. D. Shoemaker
Attorney—W. E. Finken and D. L. Ellis

[57] ABSTRACT

An adjustable control pedal apparatus including brake and accelerator pedals adapted for connection with the brake and throttle mechanisms of an automotive vehicle further includes a pivoted brake pedal carrier member suitably swingably mounted on support structure of the vehicle and an accelerator pedal carrier fixedly mounted on such support, each of the carriers having mounted for rotation thereon an Acme screw. One such screw carries an integrally formed nut end portion of the brake pedal member while the other rotatably mounts an elongated nut member pivotally carrying on a distal end thereof the accelerator pedal member. A tandem cable drive connects the two screws for simultaneous adjusting rotation under operation of a reversible electric motor connected with only one of the screws.

4 Claims, 2 Drawing Figures

INVENTOR.
Jack E. Gibas
BY
D. L. Ellis
ATTORNEY

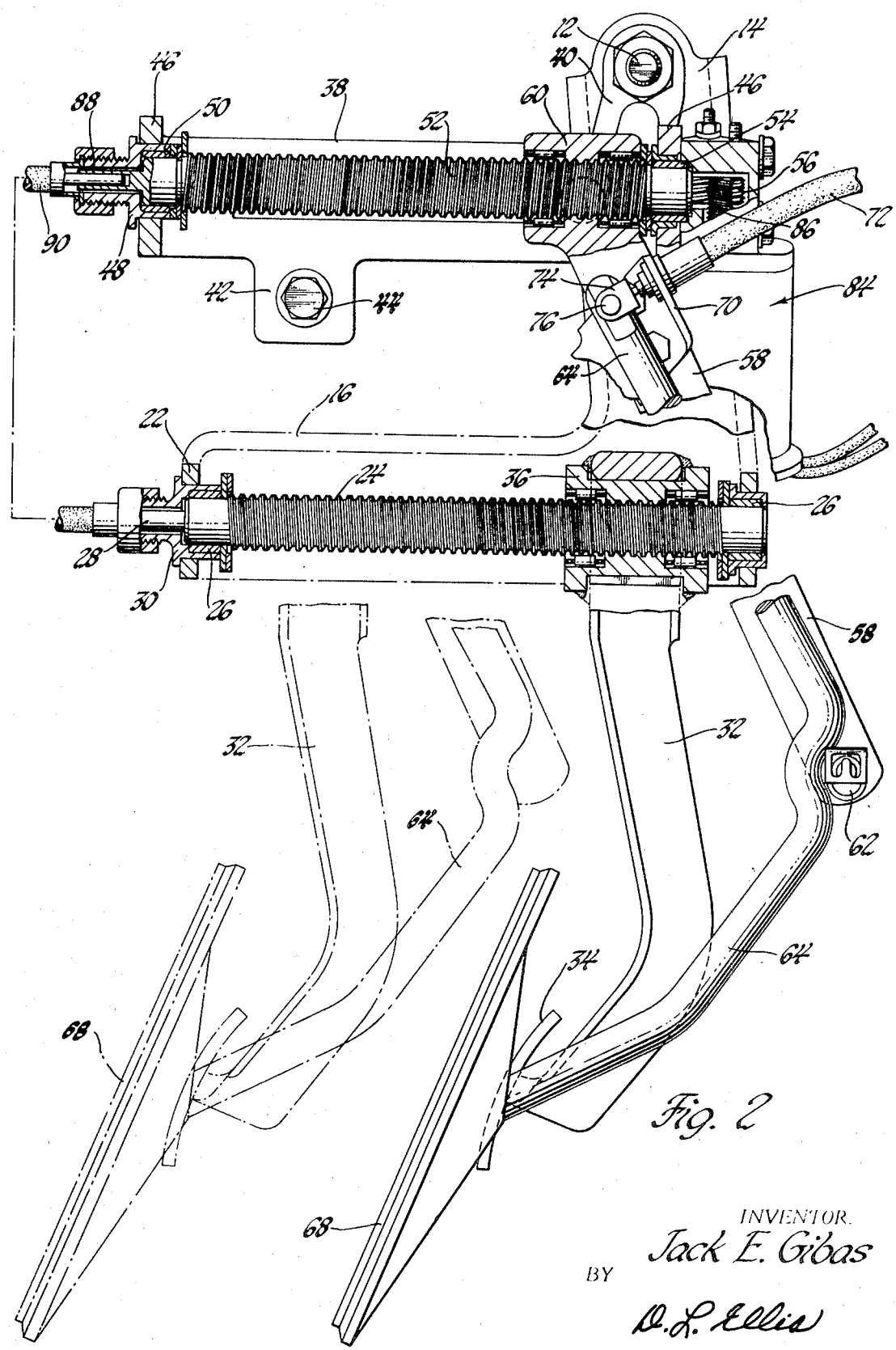

ADJUSTABLE CONTROL PEDALS FOR VEHICLES

This invention relates to vehicle control pedals and more particularly to adjustable control pedals for automotive vehicles.

The primary feature of this invention is that it provides improved adjustable control pedal apparatus for automotive vehicles and the like of the type including pendant swingable brake, throttle and similar control pedals and greatly simplified and low cost pedal position adjusting means for effecting fore and aft positional adjustment of the pedals without altering the linkage geometry or mechanical advantage characteristics of the usual connecting linkage between the pendant pedals and the respective control mechanisms to be operated.

A more specific feature of the invention is the provision of such a control pedal apparatus including a brake pedal assembly having a brake pedal carrier swingably supported on the vehicle and connected with the usual brake control rod, an accelerator pedal carrier rigidly mounted in the vehicle, both such carriers having journaled thereon a screw threadably engaged with the brake pedal member and the other with the accelerator pedal assembly. A reversible electric motor is drivingly connected with one of the screws, preferably the one rigidly carried on the support structure of the vehicle, and a rotary drive cable connects the two screws in tandem for simultaneous rotation thereof under adjusting torque applied by the motor to the one screw.

These and other features and advantages of the invention will be readily apparent from the following specification and from the drawings wherein:

FIG. 2 is a sectional view through laterally spaced planes of the control pedal apparatus showing the pedal members in a most forward adjusted position in solid lines and in another adjusted position in broken lines.

Figure 1:
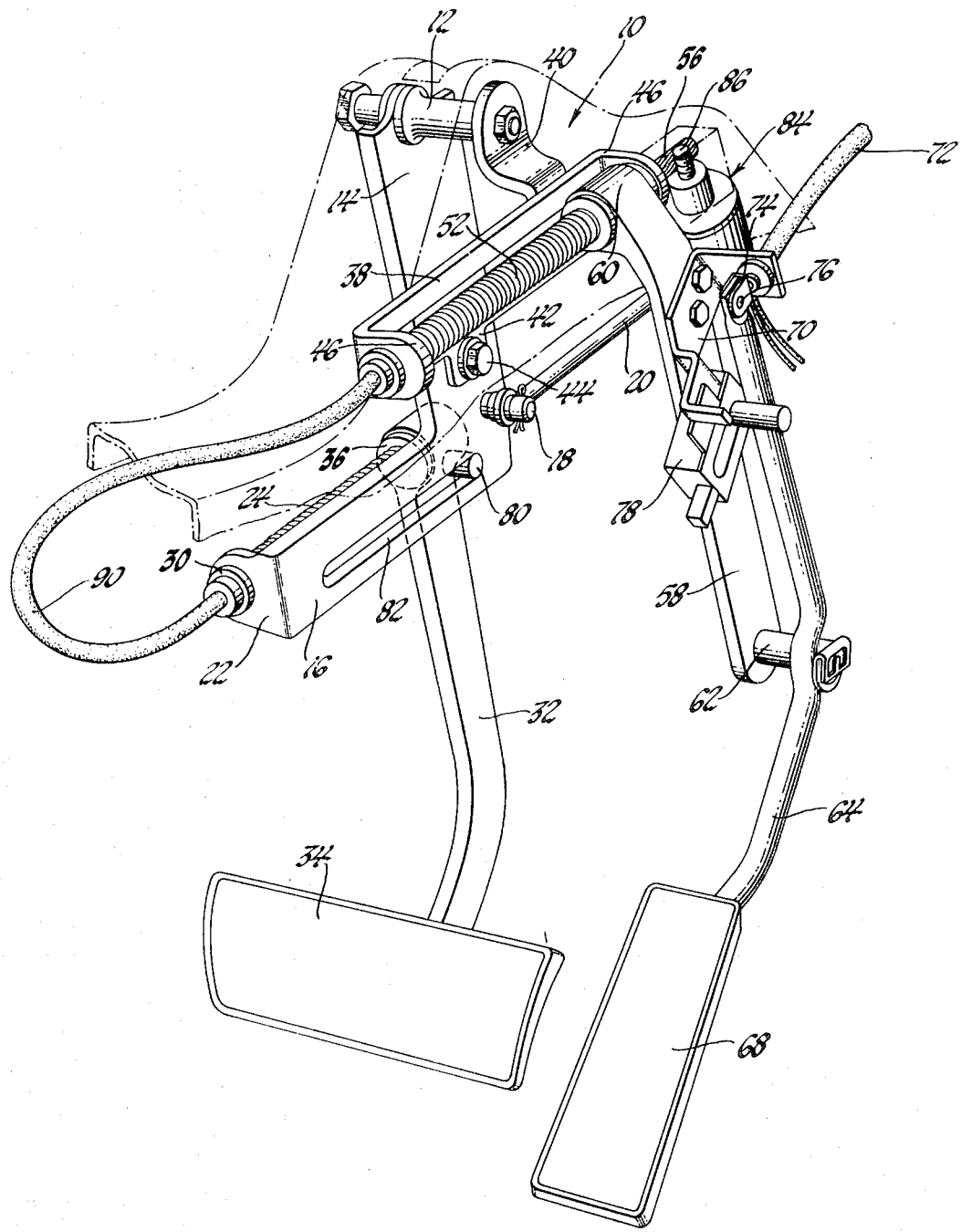
FIG. 1 is a perspective view, partially in phantom, of adjustable control pedal apparatus according to this invention.

Referring now particularly to FIG. 1 of the drawings, the reference numeral 10 indicates pedal supporting structure of an automotive vehicle adapted to mount the control pedal apparatus of this invention therewithin. Typically, such structure is within the vehicle passenger compartment proximate the vehicle firewall and underneath the usual instrument panel structure within the vehicle body and more particularly, takes the form of a boxlike structure open on its underside to exhibit a generally U-shape in section and extending from rigid attachment at its forward extremities to the vehicle firewall and suitably attached at its rearward extremities to ties or brace structure within the instrument panel. Between such extremities, the support structure includes a brake pedal support shaft 12 secured at its opposite ends by threaded connection to opposite side walls of the support structure. Journaled intermediate the ends of shaft 12 and within the support structure is one leg of an L-shaped brake pedal carrier member 14. The other leg 16 of the carrier extends in a fore and aft direction longitudinally of the vehicle. Adjacent the intersection of the two legs of the carrier a pivot stud 18 is provided to receive and hold one end of a brake mechanism control rod 20 extending forwardly of the carrier 14 in conventional fashion to be received through an aperture in the vehicle firewall and connected to the vehicle brake mechanism for selected operation of the latter under forward thrust and displacement of the control rod. The leg 16 is provided at opposite ends with bent flanges, as at 22, which are suitably apertured and provided with bearings to receive and rotatably support opposite ends of an adjusting screw 24. The screw is preferably of a low cost Acme thread construction exhibiting a medium mechanical efficiency but may of course alternatively be provided with antifriction ball screw form adapted for use with a recirculating ball nut. Of course, with the former, choice of a suitable lead screw thread makes the screws irreversible so that no additional locking mechanisms are necessary to prevent "-backdrive" rotation of the screws under the force of the operator's foot on the pedal to be described. With an antifriction ball screw, separate locking means might be required for each screw.

Referring to FIG. 2, the bearings at each end of the screw may be provided suitably of antifriction material sleeves 26 receiving smooth shaft ends of the screw 24. The rearward end of screw 24 includes a double D-shaped or like drive spindle 28 extending through a threaded cable mounting stud conformation 30 received in the aperture of flange 22 and carrying the bearing sleeve 26.

A brake pedal member 32 of an elongated conventional configuration includes on its distal end the usual foot pad 34. At its other end, the brake pedal is bored to receive therein a two-part Acme nut which is set nonrotatably into the bore from opposite sides and has the screw 24 threadably engaged therethrough. Suitable exterior flanges on the nut 36 provide shoulders engaging the upper end of the brake pedal so that screw rotation and axial thrust on the nut carries the brake pedal in a fore and aft path along the axis of the screw depending upon direction of screw rotation. Such fore and aft travel takes place between a most forward adjusted position proximate the firewall in the solid lines in FIG. 2 and any of a plurality of more rearward positions such as that indicated in broken lines.

Referring again to FIG. 1, there is attached to the right sidewall of the support structure 10 on the exterior thereof an accelerator pedal carrier 38. Such carrier is generally formed as a bracketlike piece having a first ear 40 attached on the exposed end of support shaft 12 and held by a nut, while another ear 42 depends from the carrier and is likewise attached by a fastener 44 to the sidewall of the support structure, thereby to rigidly attach carrier 38 thereto. Carrier 38 also includes at opposite ends a pair of laterally extending flanges 46 bored to receive in the forward flange another cable connecting stud 48 receiving a similar bearing sleeve 50 journaling a smooth shaft end of a second Acme adjusting screw 52. At the other end, the screw includes a smooth shaft end journaled in a plain sleeve bearing 54 retained in the flange 46, such smooth end having integrally formed thereon a driven gear 56.

A nut member 58 of elongated configuration includes at its upper end 60 a bored and integrally threaded nut portion threadably receiving the Acme screw 52 whereby the nut member is translatable fore and aft on carrier 38 under rotation of the screw between a most forward position, shown in solid lines, and any of a plurality of more rearward positions such as indicated in broken lines. At the opposite end thereof, nut member 58 includes a mounting pin, not shown, receiving a mounting sleeve 62 welded or otherwise rigidly attached intermediate the ends of an accelerator pedal 64, the sleeve 62 being held on the mounting pin by suitable fasteners. At its lower end, pedal 64 carries an accelerator foot pad 68. Adjacent the upper nut portion of nut member 58, the latter has rigidly secured thereto a bracket 70 mounting on one leg thereof the sheath portion of a conventional flexible push-pull cable 72. The core portion of such cable extends through the bracket leg and has a clip 74 pivotally secured at 76 to the upper terminal end of pedal 64. Thus, assuming the accelerator pedal 64 to be in a normal unactuated position such as shown with the clip 74 on the cable core lying adjacent bracket 70, it is seen that depression of foot pad 68 pivots the accelerator pedal counterclockwise to extend the core of cable 72. Suitable connection of the other end of the core to the vehicle throttle mechanism completes the assembly of the cable connection. Bracket 70 may also serve to mount an electrical kickdown switch 78 responsive to the position of the accelerator pedal to govern the speed ranges of a vehicle automatic transmission.

As seen best in connection with the brake pedal 32, the same includes adjacent its upper nut portion 36 a laterally extending pin 80 received in an elongated slot 82 in carrier 14. Close confinement of the pin and slot prevents any substantial reactive displacement of the brake pedal laterally of the carrier during rotation of screw 24. Similar torque restraining structure may be provided between the nut member 58 and the carrier 38.

Thus, in any adjusted position of the pedal members 32 and 64 on their respective screws, such as the most forward position shown in solid lines, the above described pressure on the accelerator foot pad 68 is always operative to control the vehicle throttle mechanism in normal manner, while similarly, actuating a foot pressure applied to the brake foot pad 34 is operative to rotate the carrier 14 about support shaft 12 and apply thrust through control rod 20 to actuate the vehicle brake mechanism. It is of course understood that the brake and accelerator assemblies may be caused to seek their unactuated positions shown by the normal return spring apparatus embodied in both the brake and throttle mechanisms.

To provide selected adjustment of the brake and accelerator units fore and aft of the vehicle relative to the passenger seat, a reversible electric motor and reduction gear unit 84 is mounted to carrier 38 adjacent the driven gear 56 with an output or drive gear 86 of such unit engaged therewith. Depending upon the selected direction of motor rotation controlled by suitable switch means located on the vehicle instrument panel or elsewhere, shaft 52 may be rotated to linearly displace nut member 58, the accelerator pedal, and flexible cable 72 along the axis of the screw 52 to any desired position.

As seen in FIG. 2, the rearward end of screw 52 includes a connector extension 88 within the cable mounting stud 48 adapted for nonrotatable connection with one end of the core of a rotary drive cable assembly 90. Cable 90 is secured to the stud 48 by a threaded cap and extends to loop over and into the interior of support structure 10 to have connection at its other end with the spindle 28 of screw 24, this being held by another threaded cap engaged on the stud 30. The screws 24 and 52 are thus connected in tandem so that actuating rotation caused in the screw 52 is also transferred through the cable to screw 24 whereby the brake and accelerator pedals may be adjusted in unison to coordinated desired positions.

It is to be recognized that more than the two brake and accelerator assemblies can be provided according to the concepts of the invention, all mounted on the same support structure 10 by additional support shafts such as that mentioned above. Additional tandem cable drive may be provided for additional pedal assemblies to have the motor and reduction gear unit 84 operative thereupon. Alternatively, as in the case of four adjustable pedals, including a clutch pedal and an emergency brake pedal, it may be desirable to provide therefor another separate motor and reduction gear unit with tandem cable drive, depending upon the size of electric motor desired and the application to the pedal unit.

In addition to the low cost of Acme screws, the latter may also provide a desired advantage in their ability to transfer any normal amount of foot pressure through brake pedal 32 and nut member 58 to cause sufficient frictional drag in the threading to stall out the motor and gear unit 84. Thus, in the event of foot pressure applied to the brake pedal during simultaneous inadvertent actuation of the motor unit to adjust the pedal, the motor will be inoperative to disrupt or alter the braking actuation applied thereto. Alternatively, with the antifriction ball screw previously mentioned, suitable switch gear may be provided to open the energizing circuit for the motor when either pedal is displaced from its unactuated position.

Having thus described the invention, what is claimed is:

1. Adjustable control pedal apparatus for a mechanism to be operated comprising a support, an actuating member, means pivotally mounting said actuating member adjacent one end thereof on said support for movement between inoperative and mechanism operating positions in a path about the pivotal axis of said mounting means, a rigid compression bearing connecting member adapted for connection to the mechanism to be operated, means connecting one end of said connecting member to said actuating member adjacent the other end thereof, a screw, means rigidly mounting said screw on said other end of said actuating member for rotation thereon about the axis of said screw, said screw axis defining a path of fore and aft linear adjustment relative to said actuating member of a pedal member, an elongated pedal member including a foot pad on one end thereof and on the opposite end thereof a nut portion threadably engaged on said screw whereby rotation of the latter effects fore and aft adjustment of said pedal member along said path independently of movement of said actuating member between said inoperative and mechanism operating positions thereof, torque restraining means on said pedal member and said actuating member holding said pedal member against reactive rotation relative to said actuating member upon rotation of said screw, and power operated means for selectively rotating said screw in opposite directions to effect said fore and aft adjustment of said pedal member in corresponding directions.

2. The control pedal apparatus recited in claim 1 wherein said torque restraining means comprises a pin on said nut engaged in a slot in said actuating member extending generally parallel the screw axis.

3. Control pedal apparatus for vehicle brake and throttle mechanisms to be operated comprising a support, a first carrier member, means mounting said first carrier member adjacent one end thereof on said support for swinging movement between inoperative and mechanism actuating positions, a brake connecting rod adapted for connection at one end thereof to a brake mechanism and pivotally connected at the other end thereof with said first carrier member adjacent the other end thereof, a first adjusting screw, means mounting said first screw on said first carrier member adjacent the other end thereof for rotation about the axis of said screw, a brake pedal member having a footpad on one end thereof and a nut portion on the other end thereof threadably mounted on said screw, a second carrier member fixedly mounted to said support, a second adjusting screw, means mounting said second screw on said second carrier member for rotation about the axis of said second screw, accelerator pedal means including a nut member threadably mounted on said second screw, said accelerator pedal means further including an accelerator pedal member carried by said nut member and a flexible cable connected to said accelerator pedal and adapted to connect the latter with the throttle mechanism to be operated, reversible power operated means connected with one of said screws for rotation thereof in opposite directions to effect fore and aft movement of the respective nut along the axis of such screw, and rotary drive cable means connecting said first and second screws in tandem for simultaneous rotation by said power operated means whereby the nut portion of said brake pedal member is adjustable fore and aft along the axis of said first screw simultaneously with adjustment of said nut member along the axis of said second screw.

4. Control pedal apparatus for vehicle brake and throttle mechanisms to be operated comprising a support, a first carrier member, means mounting said first carrier member adjacent one end thereof on said support for swinging movement between inoperative and mechanism actuating positions, a brake connecting rod adapted for connection at one end thereof to a brake mechanism and pivotally connected at the other end thereof with said first carrier member adjacent the other end thereof, a first adjusting screw, means mounting said first screw on said first carrier member adjacent the other end thereof for rotation about the axis of said screw, a brake pedal member having a foot pad on one end thereof and a nut portion on the other end thereof rotatably mounted on said screw, torque restraining means on said first carrier member and said brake pedal member holding the latter against reactive rotation on said first screw, a second carrier member fixedly mounted to said support, a second adjusting screw, means mounting said second screw on said second carrier member for rotation about the axis of said second screw, a nut member threadably mounted on said second screw, an elongated accelerator pedal member pivotally mounted intermediate the ends thereof on said nut member having a foot pad on one end, a flexible cable assembly connected to the other end of said accelerator pedal member and adapted to connect the latter with the throttle mechanism to be operated, reversible power operated means mounted stationary on said support and drivingly connected with said second screw for rotating the latter in opposite directions to effect fore and aft movement of said nut member along the axis of said second screw, and rotary drive cable means connecting said first and second screws for simultaneous rotation by said power operated means whereby said brake pedal member is adjustable fore and aft along the axis of said first screw simultaneously with said adjustment of said nut member along the axis of said second screw.

* * * * *